Aug. 20, 1968      H. KIESLICH      3,397,841

HOT WATER HEATING SYSTEM

Filed March 10, 1966

INVENTOR.
HORST KIESLICH

BY Michael S. Striker his ATTORNEY

United States Patent Office 3,397,841
Patented Aug. 20, 1968

3,397,841
HOT WATER HEATING SYSTEM
Horst Kieslich, Hunfeld, Germany, assignor to Ondal G.m.b.H., Hunfeld, Hesse, Germany
Filed Mar. 10, 1966, Ser. No. 533,282
11 Claims. (Cl. 237—8)

ABSTRACT OF THE DISCLOSURE

A first circuit contains a fluid to be heated. A second conduit contains a heated fluid. At least one radiator is connected with the first conduit for dissipating heat and a boiler is connected with the other conduit for heating the fluid therein. A circulator is provided in the one conduit. A thermostat is provided and operative for respectively starting and arresting operation of the circulator when the temperature in the area accommodating the thermostat drops below and rises above a preselected range. An adjustable mixer valve connects portions of the two conduits with one another, a second thermostat is provided which adjusts the mixer valve as a function of fluid temperature in the conduit containing the fluid to be heated and the radiator.

---

Figure 3:
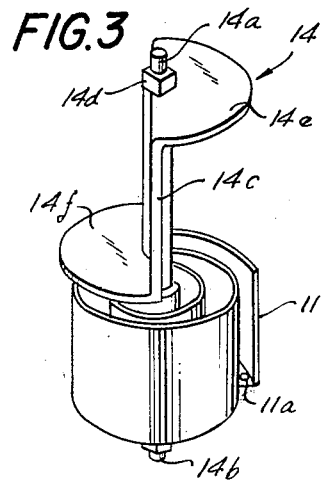

The present invention relates to a control system and to a method of operating the same. More particularly, the invention relates to a control system which can be used as an indoor heating system operating preferably, but not necessarily, with water or another liquid carrier of heat energy. A serious problem which arises in operation of presently known hot water indoor heating systems is that the heat energy requirements of the heat dissipating or radiator circuit which contains one or more heat dissipating elements (for example, one or more room radiators) often fluctuate within a very wide range and that, therefore, the supply or boiler circuit which includes a boiler or an analogous heating unit is often overloaded beyond the capacity of the heating unit. As a rule, the temperature of the area accommodating the radiator or radiators is sensed by a two-point room thermostat which starts a suitable pump to effect mixing of hot water in the boiler circuit with cold water in the radiator circuit.

It is an important object of the present invention to provide a novel and improved control system which can be utilized as a hot water heating system and which is constructed and assembled in such a way that it permits for gradual but rapid heating of one or more rooms and that the transfer of heat energy from the boiler circuit to the radiator circuit is invariably commensurate with the capacity of the boiler.

Another object of the invention is to provide the improved control system with a novel mixer valve which effects exchange of fluids between the boiler circuit and the radiator circuit in such a way that the temperature of fluid in the boiler circuit cannot drop below a preselected value.

A further object of the invention is to provide a control system of the above outlined characteristics wherein the actual regulation of fluid temperature in the radiator circuit is effected by a small number of relatively simple control elements.

A concomitant object of the invention is to provide a novel method of operating the improved control system.

An additional object of the invention is to provide a novel mixer valve.

Briefly stated, one feature of the present invention resides in the provision of a method of automatically regulating the circulation of energy-carrying fluid in two closed circuits each of which contains a heat exchanger respectively serving to cool and to heat the fluid in the corresponding circuit and wherein the two circuits can exchange fluids to regulate the temperature of fluid in one of the circuits. The method comprises the steps of intermittently starting and terminating the circulation of fluid in the one circuit in dependency on the temperature prevailing in the area which accommodates the respective heat exchanger, measuring the temperature of circulating fluid in the one circuit downstream of the respective heat exchanger, and adjusting the rate of fluid exchange between the two circuits in dependency on the result of such measurement.

For example, the one circuit may be the radiator circuit of a hot water indoor heating system and the other circuit is then the boiler circuit. A mixer valve which permits a predetermined minimum exchange of water between the two circuits may be controlled by a thermostat which measures the temperature of water flowing from one or more radiators and, when such temperature rises, the thermostat opens further the mixer valve so that the latter allows for greater exchange or mixing of water in the two circuits. Water in the radiator circuit may be circulated by an electric pump which is started and arrested by a two-point room thermostat, the latter being arranged to start the pump when the temperature in the area accommodating the room thermostat drops to below a predetermined minimum value and to arrest the pump when such temperature rises to a predetermined maximum value. The thermostat which regulates the mixer valve prevents overloading of the boiler circuit (i.e., excessive cooling of water in the boiler circuit) because it causes the mixer valve to admit more hot water from the boiler circuit only when the temperature of water flowing back from the radiator or radiators begins to rise. Initial adjustment (starting position) of the mixer valve can be readily selected in such a way that the boiler circuit is not overloaded in response to starting of the circulating pump.

Figure 1:
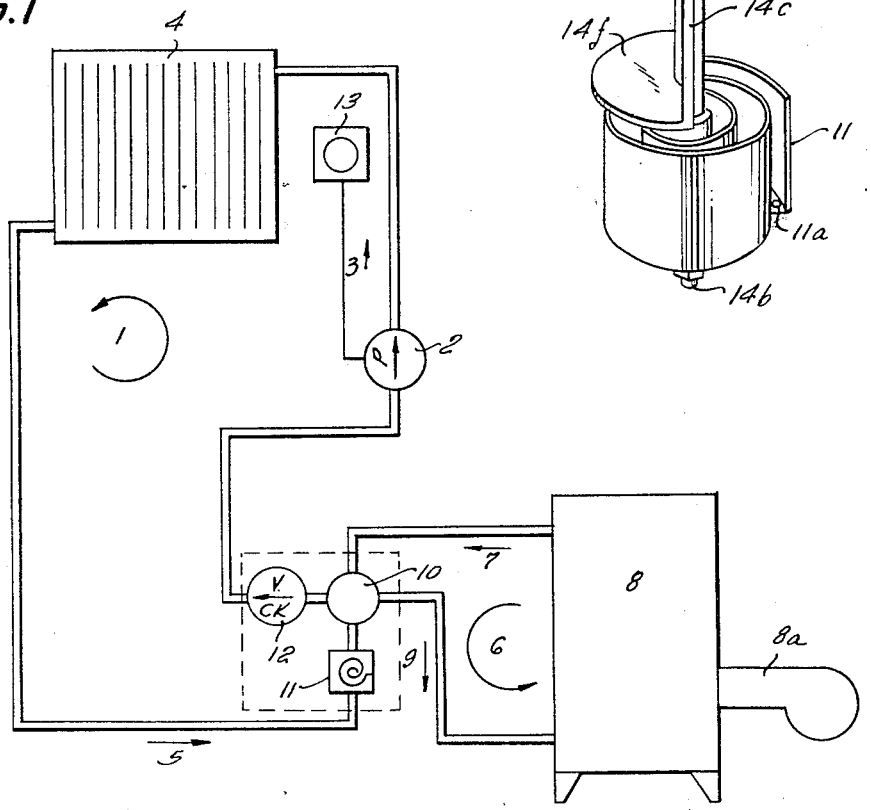
Figure 2:
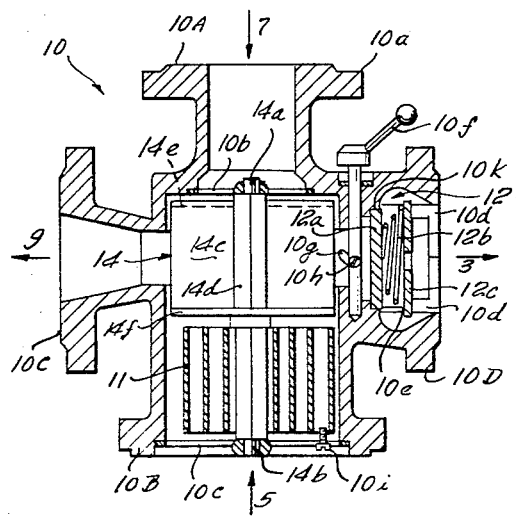

The novel features which are considered as characteristic of the invention are set forth in particular in the appended claims. The improved control system itself, however, both as to its construction and its mode of operation, together with additional features and advantages thereof, will be best understood upon perusal of the following detailed description of a specific embodiment with reference to the accompanying drawings, in which:

FIG. 1 is a diagram showing the essential components of a hot water indoor heating system which is constructed and assembled in accordance with the present invention;

FIG. 2 is an enlarged axial section through a mixer valve which is utilized in the heating system of FIG. 1; and FIG. 3 is a perspective view of a specially configurated valve member which is used in the mixer valve of FIG. 2 and of a bimetallic thermostat which is utilized to adjust the valve member as a function of water temperature in the coolest part of the radiator circuit, the valve member being shown in a position turned through an angle of 90 degrees with reference to the position of FIG. 2.

Referring to the drawings in detail, and first to FIG. 1, there is shown a hot water indoor heating ssytem which comprises two closed circuits 1 and 6. The circuit 1 is the radiator circuit and dissipates heat. The circuit 6 is a boiler circuit and serves to supply hot water to the radiator circuit 1 whenever necessary. In the illustrated embodiment, water filling the circuit 1 flows through a single radiator 4 which constitutes a heat dissipating element or heat exchanger and whose function is to heat the area therearound, e.g., a room. The room temperature is measured by a first control element here shown as a two-point room thermostat 13 which is operatively connected with an electric circulating pump 2 installed in the radiator circuit 1 downstream of a mixer valve 10 which is mounted at the junction of the circuits 1 and 6 and serves to permit exchange of water between the two circuits in order to effect rapid but fully controlled heating of the area accommodating the thermostat 13. The arrows 3 and 5 indicate the direction in which water filling the radiator circuit 1 flows when the pump 2 is in operation. This pump will be started and arrested by the thermostat 13 whenever the temperature in the area heated by the radiator 4 drops below or rises above a predetermined range, such range being adjustable by appropriate settings of the thermostat 13.

The boiler circuit 6 contains a suitable heater 8, e.g., a hot-water boiler of conventional design which includes a stoker or burner 8a. Water filling the boiler circuit 6 reflows in directions indicated by the arrows 7 and 9. A check valve 12 is installed in the radiator circuit 1 immediately downstream of the mixer valve 10 (in fact, and as shown in FIG. 2, the check valve 12 may be accommodated in the body or housing 10a of the valve 10), and the valve member 14 (see FIG. 3) of the valve 10 is adjustable by a second control element in the form of a bimetallic thermostat 11 which is installed in the radiator circuit 1 immediately upstream of the mixer valve 10, i.e., downstream of the radiator 4.

The nature of the improved heating system is such that the valve member 14 need not entirely seal the flow of water between the circuits 1 and 6. This will be readily understood since, otherwise, starting of the pump 2 could not result in a raising of temperature in the radiator circuit 1 and the thermostat 11 would fail to effect further opening of the mixer valve 10. At the same time, such absence of the need for a full sealing action of the valve member 14 contributes to a greater simplicity of the valve 10 which, as shown in FIGS. 2 and 3, may be constructed and assembled as follows: The body or the housing 10a has two inlets 10A, 10B and two outlets 10C, 10D. Two cruciform holders or carriers 10b, 10c are press-fitted into the housing 10a to support the trunnions 14a, 14b of the valve member 14. The latter further comprises a preferably polygonal spindle or shaft 14d which extends between the trunnions 14a, 14b and across a rectangular flap 14c so that the latter comprises two wings disposed at the opposite sides of the shaft 14d. In addition, the valve member 14 comprises two substantially semicircular end panels 14e, 14f (see particularly FIG. 3) disposed at the ends of the flap 14c and at the opposite sides of the shaft 14d in planes making right angles with the plane of the flap.

The bimetallic thermostat 11 resembles a helix or coil one end of which is affixed to the shaft 14d, the latter extending beyond the end panel 14f. The other end of the thermostat 11 is formed with an aperture 11a for the stem of a connecting screw 10i or a like fastener which can be threaded into one of several tapped bores provided in the cruciform holder 10c so that the initial setting of the thermostat 11 may be adjusted by the operator.

The check valve 12 is mounted in the outlet 10D and comprises a disk- or plate-like valve member 12a which is biased against an annular seat 10k by a helical valve spring 12b. The right-hand end convolution of the spring 12b bears against a removable retainer 12c which is apertured to offer less resistance to the flow of water and is held in the position shown in FIG. 2 by a set of three equidistant ribs or fins 10d (only two shown) which are frictionally fitted into the outlet 10D. The retainer 12c bears against stops 10e of the housing 10a.

A manually operable actuating lever 10f is rotatably mounted in the outlet 10D and carries two projections or arms 10g, 10h which can respectively move the flap 14c and valve member 12a to fully open positions. The purpose of the lever 10f is to facilitate filling of the circuits 1 and 6 with water and to permit heating by gravity flow in the event of current failure.

The operation of the heating system is as follows:

The two-point thermostat 13 starts the circulating pump 2 whenever the temperature prevailing in the area accommodating the radiator 4 drops below a preselected minimum value. The pump 2 draws water from the outlet 10D of the mixer valve 10 and opens the one-way valve 12 so that the water circulates in directions indicated by the arrows 3 and 5 and, since the mixer valve 10 is not entirely closed, some hot water flowing into the inlet 10A and out from the outlet 10C will mix with water in the radiator circuit 1 whereby the thermostat 11 opens the mixer valve 10 at a rate proportional with the rising water temperature in the downstream portion of the radiator circuit 1. Water filling the radiator circuit 1 remains cold until the pump 2 is set in motion, and this pump is started not only when the thermostat 13 responds to a predetermined drop in temperature but also when the setting of the thermostat 13 is changed independently of the ambient temperature, for example, if the occupants wish to raise the temperature at which the pump 2 should begin to circulate water in the circuit 1. The spring 12b maintains the valve member 12a of the one-way valve 12 in closed position as long as the pump 2 is idle so that the fact that the valve member 14 does not completely seal the inlet 10B and outlet 10D from the inlet 10A and outlet 10C is of no consequence. In other words, in its starting position, the valve member 14 can also some water filling the inlet 10A and outlet 10C to mix with water in the inlet 10B.

When the pump 2 is started and opens the one-way valve 12, cold water circulating in the direction indicated by arrows 3 and 5 mixes with some hot water which circulates in the boiler circuit 6 as indicated by the arrows 7 and 9. As long as the pump 2 remains in operation, water flowing back to the inlet 10B becomes progressively hotter because the circulation in the radiator circuit 1 is sufficiently rapid to compensate for heat losses at the radiator 4, i.e., the valve 12 discharges overheated water. The thermostat 11 responds to a predetermined rise in temperature prevailing in the inlet 10B and turns the valve member 14 so as to permit more water to flow from the circuit 6 into the circuit 1 and vice versa whereby the radiator 4 heats the surrounding area to a temperature at which the thermostat 13 arrests the pump 2. The temperature in the area accommodating the thermostat 13 then begins to drop and the pump 2 is started again at the exact time determined by the setting of the thermostat 13.

The thermostat 11 prevents excessive mixing of water in the circuits 1 and 6 so that the water temperature in the circuit 6 cannot drop to below a preselected value. On the other hand, the boiler 8 can be used to capacity in each angular position of the valve member 14.

The drop in boiler water temperature and fluctuations in the temperature of water flowing from the outlet 10D to the pump 2 are very small despite the fact that the thermostat 13 is of the two-point type, i.e., that the pump 2 is respectively started and arrested without any gradual transition in response to a preselected minimum and a maximum temperature. This is due to the provision of the thermostat 11 which can effect gradual opening of the valve 10, and also to such setting of the valve member 14 that the latter allows for some mixing of hot and cold water as soon as the pump 2 is started, i.e., as soon as the one-way valve 12 opens. The heating system can be started without causing substantial fluctuations in the boiler temperature. Undesirably high drops in boiler temperature are avoided because the valve member 14 cannot be moved to fully open position when the temperature of water flowing from the radiator 4 to the inlet 10B is low. This will be readily understood since only the thermostat 11 can effect full opening of the valve 10 and this thermostat can effect such opening only when water returning from the radiator 4 is very hot.

When the load upon the heating system is of short duration and increases very suddenly, for example, in the morning when the heating system is switched from night heating (or no heating) to day heating or when several additional radiators are connected in the circuit 1, the thermostat 11 again prevents excessive loading of the boiler 8 and resultant overcooling of water in the circuit 6 because it opens the valve 10 only in response to rising temperature of water which returns from one or more radiators. In other words, the heating action is commensurate with the capacity of the boiler 8.

A very important feature of the improved method is that, despite, intermittent operation of the pump 2 under the two-point control of the room thermostat 13 (i.e., under a control according to which the pump is started when the room temperature drops to a predetermined minimum value and is arrested when such temperature rises to a predetermined maximum value), the control system can be utilized for regulating radiator circuits of first or higher order with any desired time constant. This is due to the fact that the pump 2 is placed in series with the mixer valve 10 whereby the adjustment of the valve 10 depends on the on-and-off behavior of the thermostat 13. The speed of adjustments in the position of the valve member 14 is directly influenced by the time constant of the radiator circuit 1. The thermostat 11 senses the transitory condition of the circuit 1 and, either directly or indirectly, adjusts the valve member 14 accordingly.

The thermostat 13 affects the boiler circuit 6 only by generating energy pulses of identical amplitude because the valve 10 determines the surplus output. The basic amount of heat energy transmitted to the radiator circuit 1 is determined by the thermostat 13 and one-way valve 12. The amount of additional heat energy is determined by the valve 10 in dependency on the thermostat 11. Thus, regardless of the heat energy requirements of the circuit 1, the valve 10 will invariably admit the same basic amount of heat energy and the quantity of additional heat energy depends on the changing temperature of fluid which reenters the valve 10 after having passed the radiator or radiators 4. The control system is superior to presently known control systems with two-point thermostats because its behavior is predictable within a very wide range of conditions. The quality and accuracy of the regulating operation depend mainly on the surplus output, i.e., on the difference between the available energy (circuit 6) and the load or energy requirements (circuit 1) at any given moment when the system is in operation.

The utilization of the improved control system is of particular advantage when the exact times at which the circuit 1 is to be used are unknown, as well as when the energy requirements of the circuit 1 vary within a very wide range. The inertia of the valve 10 is zero because the flow of energy to the circuit 1 under the action of the thermostat 13 can be initiated or terminated instantaneously.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. A heating system comprising a primary heating circuit and a second heating circuit; a heat exchanging means in said primary heating circuit for heating fluid flowing in the same; a heat exchanger in said secondary heating circuit adapted to transfer heat from a fluid flowing in said secondary heating circuit to a surrounding medium; a circulating pump in said secondary heating circuit; and a four-way valve interconnecting said primary heating circuit with said secondary heating circuit and having a first inlet and a first outlet communicating with said secondary heating circuit and a second inlet and a second outlet communicating with said primary heating circuit, said four-way valve including valve means movable between a first position in which said first inlet communicates with said first outlet to a greater extent than with said second outlet and said second inlet communicates with said second outlet to a greater extent than with said first outlet so that said two circuits are substantially independent of each other, and a second position in which said first inlet communicates with said second outlet to a greater extent than with said first outlet and said second inlet communicates with said first outlet to a greater extent than with said second outlet so that circulation of fluid in said secondary heating circuit will also result in circulation of such fluid by said circulating pump through said primary heating circuit, fluid from said secondary heating circuit thus entering said primary heating circuit and reentering from the same in heated condition into said secondary heating circuit; and thermostat means, including sensing means arranged in said first inlet and comprising adjusting means for regulating the position of said valve means so that the valve means will be in said first position when the temperature of the circulated fluid in said secondary heating circuit at said first inlet exceeds a predetermined temperature, while said valve means will move to said second position thereof in response to decreasing of the temperature of said fluid at said first inlet below said predetermined temperature.

2. A heating system as set forth in claim 1, wherein said thermostat means is arranged to determine the temperature of fluid downstream of said heat exchanger.

3. A heating system as set forth in claim 2, wherein said pump is installed in said secondary circuit downstream of said valve and upstream of said heat exchanger.

4. A four-way mixer valve, particularly for use in indoor heating systems, comprising a body defining a mixing chamber and being provided with a first and a second inlet and a first and a second outlet which communicate with said mixing chamber; a valve member installed in said body to regulate the flow of fluids through the inlets and outlets thereof and being movable between a first position in which said first inlet communicates with said first outlet to a greater extent than with said second outlet and said second inlet communicates with said second outlet to a greater extent than with said first outlet, and a second position in which said first inlet communicates with said second outlet to a greater extent with said first outlet and said second inlet communicates with said first outlet to a greater extent than with said second outlet so as to permit rapid mixing of fluid entering through said first inlet with fluid entering through said second inlet and passage of the thus mixed fluids through said first and second outlets; and thermostat means, including sensing means arranged in said first inlet and comprising adjusting means for regulating the position of said valve member as a function of the fluid temperature at said first inlet.

5. A mixer valve as set forth in claim 4, further comprising a normally closed check valve provided in said first outlet to prevent return flow of fluid into said body.

6. A mixer valve as set forth in claim 5, further comprising manually operable actuating means for opening said check valve and for simultaneously moving said valve member from said first position to said second position.

7. A control system of the character described, comprising a pair of fluid-containing circuits having portions adjacent to each other; heat dissipating means provided in one of said circuits, and heating means provided in the other of said circuits; adjustable mixer means connecting said portions of said circuits and comprising a four-way valve having a housing provided with two inlets and two outlets and a valve member; circulating means provided in said one circuit and including a pump installed in said one circuit downstream of said mixer means and upstream of said heat dissipating means; first temperature-responsive control means, including a first thermostat, for respectively starting and arresting said circulating means when the temperature in the area accommodating said control means respectively drops below and rises above a preselected range; and second temperature-responsive control means, including a second thermostat, arranged for determining the temperature of fluid downstream of said heat dissipating means and for adjusting said mixer means as a function of the fluid temperature in said one circuit, said second thermostat being operative for moving said valve member to thereby regulate the flow of fluid between said inlets and said outlets in such a way that the rate of mixing increases in response to increasing temperature of fluid in said one circuit.

8. A control system as set forth in claim 7, wherein said second thermostat is installed in the housing of said valve.

9. A control system as set forth in claim 7, wherein said valve member is a rotary valve member and is arranged to permit at least some mixing of fluids in said circuits in each angular position thereof.

10. A control system of the character described, comprising a pair of liquid-containing circuits having portions adjacent to each other; adjustable mixer means connecting said portion of said circuits and including a four-way valve having two inlets and two outlets and a valve member movable between a plurality of different positions to thereby regulate the flow of fluid between said inlets and said outlets, one inlet and one outlet being connected into each of said circuits; circulating means provided in one of said circuits; heat dissipating means also provided in said one circuit and comprising at least one radiator installed in said one circuit downstream of said circulating means; heating means provided in the other of said circuits and including a boiler; one-way valve means disposed in the outlet connected into said one circuit intermediate said circulating means and said mixer means for preventing return flow of liquid to said mixer means and for preventing circulation of liquid in said one circuit when said circulating means is idle; first temperature-responsive control means for respectively starting and arresting said circulating means when the temperature in the area accommodating said control means respectively drops below and rises above a preselected range; and second temperature-responsive control means arranged to determine the temperature of liquid downstream of said heat dissipating means and for adjusting said mixer means as a function of the fluid temperature in said one circuit.

11. A control system as set forth in claim 10, further comprising manually operable actuating means for simultaneously opening said four-way valve and said one-way valve means.

References Cited

UNITED STATES PATENTS

| | | | |
|---|---|---|---|
| 2,065,481 | 12/1936 | Thulman | 237—8 |
| 2,700,506 | 1/1955 | Berntson | 236—12 |
| 2,751,156 | 6/1956 | Morgan | 237—8 |
| 2,781,174 | 2/1957 | Smith | 237—8 |
| 3,148,828 | 9/1964 | Whittell | 236—12 |

EDWARD J. MICHAEL, *Primary Examiner.*